United States Patent Office 3,288,884
Patented Nov. 29, 1966

3,288,884
RESINOUS COMPOSITION COMPRISING A VINYL CHLORIDE POLYMER AND A HALOGENATED POLYEPOXIDE
Lawrence F. Sonnabend and James N. Schramm, Midland, Mich., assignors to The Dow Chemical Company, Midland, Mich., a corporation of Delaware
No Drawing. Filed July 20, 1964, Ser. No. 383,938
6 Claims. (Cl. 260—837)

This application is a continuation-in-part of application Serial No. 197,875, filed May 28, 1962, now abandoned.

This invention relates to resinous compositions containing vinyl chloride polymer as their major constituent and possessing excellent processing characteristics, and toughness and clarity and relates more particularly to substantially rigid vinyl chloride polymer compositions containing a modifying agent imparting enhanced processability, improved heat distortion properties, and increased impact strength.

In a particular aspect, the invention provides improved, substantially rigid compositions comprising vinyl chloride polymers containing at least about 80 percent vinyl chloride units having incorporated therewith from about 5 to 30 parts by weight based on the weight of vinyl chloride polymer of a thermoplastic, high-polymer, resin which employs an epoxide or oxirane-containing compound in the preparation thereof.

Vinyl chloride polymer, particularly polyvinyl chloride, possesses a combination of physical properties rendering it particularly suitable for the manufacture of certain flexible plastic articles, such as tubing and the like. However, polyvinyl chloride polymers, as heretofore commercially available, generally possess properties which limit considerably their use in the manufacture of rigid articles.

The addition of certain plasticizers in quantities of about 25 to 100 parts per 100 parts of polymer in some cases improves the impact strength of the vinyl chloride polymers. However, articles prepared from this plasticized polymer are soft and flexible and unsuited for use in manufacturing hard, substantially rigid articles. Moreover, the tensile strength, and heat distortion temperatures of these materials are generally greatly reduced by the addition of such plasticizers.

Certain copolymeric compositions have also been proposed as processing aids for polyvinyl chloride. However, unless the composition additionally contains an elastomeric toughening agent, the product displays the brittleness characteristic of polyvinyl chloride.

Accordingly, it is the principal object of the present invention to provide resinuous compositions composed of vinyl chloride polymers and modifying agents, as defined herein, which compositions have enhanced processability, improved heat distortion properties, and increased impact strength while retaining good toughness, hardness, rigidity and clarity.

Other and related objects will become apparent from the following specification and claims.

These objects are realized, according to the invention, by forming a composition comprising an intimate mixture of:

(1) Between about 70 and 95 parts by weight of a vinyl chloride polymer containing at least about 80 weight percent of polymerized vinyl chloride in the polymer molecule with the remainder being at least one monoethylenically unsaturated comonomer and (2) Between about 5 and 30 parts by weight of a thermoplastic polymeric modifying agent having a molecular weight of at least about 30,000 and preferably between about 50,000 and 70,000 and a softening temperature of at least about 90° C., and preferably at least about 100° C., which consists essentially of a halogenated derivative of epichlorohydrin and a 4,4'-alkylidene bisphenol produced by the reaction of essentially stoichiometric amounts of a 4,4'-alkylidene bisphenol with a diglycidyl ether of a 4,4'-alkylidene bisphenol in the presence of a catalytic amount of a tertiary amine, where one of said 4,4'-alkylidene bisphenol and diglycidyl ether of 4,4'-alkylidene bisphenol has from about 3 to 4 halogen atoms selected from the group consisting of chlorine and bromine attached to the nuclear carbon atoms.

These compositions have excellent processing characteristics. That is, they fuse readily on a compounding mill to give a smooth rolling bank. The stock on the mill is well knit along the edge of the rolls and, when removed from the rolls, has little tendency to shrink. Accurately dimensioned articles are therefore readily fabricated from these compositions.

In addition to possessing excellent processability, the compositions of the present invention and articles formed therefrom are characterized by improved heat distortion properties and increased impact strength and still possess good tensile strength, toughness, hardness and rigidity.

The vinyl chloride polymers used in preparing the compositions of the invention include the homopolymer of vinyl chloride, i.e. polyvinyl chloride, and copolymers of vinyl chloride with monoethylenically unsaturated monomers wherein the copolymer contains at least about 80 percent of the vinyl chloride units. The materials to be copolymerized with the vinyl chloride include, but are not restricted to vinyl acetate, vinylidene chloride, diethyl fumarate, methyl methacrylate, methacrylonitrile, acrylonitrile, styrene, allyl alcohol, ethylvinyl succinate, allyl ethyl phthalate, vinyl benzoate, allyl acetate, and the like and mixtures thereof.

Particularly preferred vinyl chloride polymer starting materials comprise polyvinyl chloride and copolymers of vinyl chloride with ethylenically unsaturated esters, vinylidene chloride, styrene and acrylonitrile.

The thermoplastic polymeric modifying agents useful for the present invention are the subject of copending application Serial No. 82,711, filed January 16, 1961, by Lawrence F. Sonnabend, entitled, "Thermoplastic Fire-Retardent, High-Polymer Epoxide Resin Composition."

Such polymeric modifying agents can be prepared by polymerizing in mass, or in a substantially inert liquid reaction medium and at a temperature of about 165° C. (1) a diglycidyl ether having an average of about two terminal oxirane groups per molecule, prepared by reacting epicholorohydrin with a 4,4'-alkylidene bisphenol such as 4,4'-isoalkylidene-bis(2,6-dibromophenol),
4,4'-isoalkylidenebis(2,6-dichlorophenol),
4,4'-isoalkylidenebis(bromophenol),
4,4'-methylenebis(2,6-dichlorophenol)
4,4'-methylenebis(2,6-dibromophenol),
4,4'-methylenebisdiphenol, and
4,4'-isoalkylidene-diphenol and (2) a 4,4'-alkylidene bisphenol such as 4,4'-isoalkylidene-bis(2,6-dibromophenol),
4,4'-isoalkylidene(2,6-dichlorophenol),
4,4'-isoalkylidenebis(chlorophenol),
4,4'-isoalkylidenebis(bromophenol),
4,4'-methylenebis(2,6-dibromophenol),
4,4'-methylenebisdiphenol and
4,4'-isoalkylidenediphenol, in a ratio of between about 0.95 and 1.05 moles of the diepoxide ether per mole of the 4,4'-alkylidene bisphenol; wherein at least one of the diglycidyl ether and 4,4'-alkylidene bisphenolic reactants contain bromine or chlorine substituents attached directly to carbon atoms of the aromatic nuclei (such halogen substituent preferably being present in an amount sufficient to provide at least 10.5 percent of bromine, when bromine is the halogen, and at least 19.0 percent of chlorine, when chlorine is the halogen, based on the weight of the composition) in the presence of (3) a tertiary amine catalyst, in an amount sufficient to provide at least 0.02 percent nitrogen, by weight of said composition, added as $NR_3$ wherein each R is an alkyl substituent containing between two and six carbon atoms. Exemplary of such tertiary amine catalysts are: triethylamine and the isomers of tripropyl, tributyl, triamyl and trihexyl amine, diethylpropyl amine, or mixtures thereof.

Upon completion of the reaction, the resulting reaction product is cooled to produce a thermoplastic, substantially rigid polymeric composition having a tensile strength of at least about 7,000 p.s.i., a percent elongation of at least about 3.5, a tensile modulus of at least about $4.0 \times 10^5$ p.s.i., an impact resistance of at least about 1.5 foot pounds per inch of notch, a Rockwell hardness of at least about 50, a dielectric constant at 10.5 cycles per second of at least about 3.5 micro-microfarads, a molecular weight of at least about 30,000 and usually between 50,000 and 70,000, and a softening temperature of at least about 90° C. and usually not less that 100° C. as determined by the Deflection Temperature of Plastics Under Load, A.S.T.M. Test No. D–648–56.

The polymeric modifying agent is added to the vinyl chloride polymer at any suitable time. Thus the modifying agent may be added, for example, immediately after the polymerization of the vinyl chloride monomer or immediately before the manufacture of hard, substantially inflexible articles therefrom.

The polymeric modifying agents can be combined with the vinyl chloride material while both are in the form of a powder, or they may be incorporated with one another while one or both are in a substantially molten form. For example, they may be combined with one another in any desirable manner whereby intimate mixing of the materials is obtained. Thus, they may be mixed, on rolls heated to temperatures in the range of, for example, from about 150° C. to 180° C.

Further ingredients, such as fillers, pigments, stabilizers, lubricants, etc., may be incorporated into the mixture. Examples of stabilizers are organic compounds containing inorganic elements, tribasic sulfate, dibasic lead stearate, epoxy stabilizers and the like.

The compositions prepared in accordance with the invention may be worked up in the usual manner, e.g., by extrusion, injection molding, molding, rolling, etc. into shaped articles, which in addition to the improved processability and heat distortion properties, possess all the desirable properties of articles manufactured from hard, substantially rigid vinyl chloride polymer.

Optimum results with respect to superior processability, improved heat distortion properties, and increased impact strength of the vinyl chloride polymer compositions of the present invention are obtained with the use of the polymeric modifying agents defined herein in an amount of at least about 5 parts, and preferably from 5 to 30 parts, by weight of the polymeric modifying agent, however, greater amounts may be used if desired.

The following example, wherein all parts and percentages are to be taken by weight, illustrate the present invention but is not to be construed as limiting its scope.

*Example*

In each of a series of experiments, a formulation composed of varying amounts of (1) polyvinyl chloride was individually mixed on a roller mill with (2) a thermoplastic polymeric modifying agent consisting essentially of the reaction product formed by polymerizing a monomeric mixture composed of (a) 36.10 weight percent of the diglycidyl ether of 4,4'-isopropylidenediphenol and (b) 38.33 weight percent of 4,4'-isopropylidenebis-(2,6-dichlorophenol), in the presence of (c) a catalyst system composed of 0.57 weight percent of triethylamine, and (d) 25 weight percent methyl-isobutyl ketone. The combined weights of the mixture totalling 100 weight percent.

To each mixture of polymers was added 3 parts by weight of the total weight of the polymeric mixture of the stabilizer dibutyltin S,S' bis(3,5,5 trimethylhexylmercaptoacetate) and 1 part by weight based on the total weight of the polymeric mixture of stearic acid.

The roller temperature was approximately 165° C. and the mixing time approximately 15 minutes, during which time a homogeneous plastic mass was formed from each individual formulation.

Each of the formulations was individually rated for ease of processability as shown in the following Table I.

The individual homogeneous plastic masses were cooled and separately removed from the roller mill, and test pieces about 6 inches wide by 6 inches in length by 0.125 inches thick were prepared in a compression press, by heating the same for about 2 minutes at a platen temperature of about 150° C. Each of the test pieces was subsequently tested as shown in the following Table I.

In all instances the physical properties of the molded test pieces were determined as follows:

Tensile strength, p.s.i. (ASTM D–638–58T).
Izod impact strength, at 23° C., foot-pounds per inch of notch (ASTM D–256–56).
Flexural modulus, p.s.i. (ASTM D–790–58T).
Processability—ease of processing on a roller mill operating at 165° C. for about 15 minutes.

TABLE I

| Run No. | 1 | 2 |
| --- | --- | --- |
| Formulation—Parts by Weight: | | |
| PVC | 100 | 90 |
| Polymeric Modifying Agent | | 10 |
| Test Samples, Properties: | | |
| Tensile Strength, p.s.i. | 7,000 | 8,000 |
| Izod Impact Strength | 0.5 | 0.6 |
| Flexural Modulus, p.s.i. | 400,000 | 472,000 |
| Processability | poor | good |
| Clarity | good | good |

The improvement of processability, heat distortion, impact strength, and the effects on tensile strength is readily apparent from the above results.

Similar good results are obtained by forming compositions comprising an intimate mixture of (1) between about 70 and 95 parts by weight of any vinyl chloride polymer containing at least about 80 weight percent of polymerized vinyl chloride in the polymer molecule, as defined herein and (2) the prescribed amounts of any of the herein disclosed thermoplastic polymeric modifying agents. It has been found, however, that compositions prepared as described herein but utilizing non-halogenated thermoplastic polymeric modifying agents or polymeric modifying agents having less than the required halogen content, are insufficiently compatible with the defined vinyl chloride polymers and thereby form rigid thermoplastic compositions of reduced, and often highly objectionable clarity.

What is claimed is:

1. A rigid thermoplastic composition comprising an intimate mixture of:
   (1) between about 70 and 95 parts by weight of a vinyl chloride polymer containing at least about 80 weight percent of polymerized vinyl chloride in the polymer molecule with the remainder being at least one monoethylenically unsaturated comonomer and
   (2) between about 5 and 30 parts by weight of a thermoplastic polymeric modifying agent having a molecular weight of at least about 30,000 and a softening temperature of at least about 90° C., which consists of a halogenated derivative of epichlorohydrin and 4,4'-alkylidene bisphenol wherein said halogenated derivative is produced by the reaction of essentially stoichiometric amounts of a 4,4'-alkylidene bisphenol with a diglycidyl ether of a 4,4'-alkylidene bisphenol in the presence of a tertiary amine catalyst in an amount sufficient to provide at least 0.02 percent nitrogen by weight of said composition added as $NR_3$ where each R is an alkyl substituent containing between 2 and 6 carbon atoms and wherein one of said 4,4'-alkylidene bisphenol and diglycidyl ether of 4,4'-alkylidene bisphenol has from about 3 to 4 halogen atoms selected from the group consisting of bromine and chlorine attached to the nuclear carbon atoms said halogen being present in amount sufficient to provide at least 10.5 weight percent bromine or at least 19 weight percent chlorine based on the weight of said mixture.

2. The composition of claim 1 wherein said vinyl chloride polymer is polyvinyl chloride.

3. The composition of claim 2 wherein said diglycidyl ether is the diglycidyl ether of 4,4'-isopropylidenediphenol and said 4,4'-alkylidene bisphenol is 4,4'-isopropylidene bis(2,6-dichlorophenol).

4. A method for improving the processability and heat distortion properties of an essentially rigid vinyl chloride polymer comprising intimately admixing:

(1) between about 70 and 95 parts by weight of a vinyl chloride polymer containing at least about 80 weight percent of polymerized vinyl chloride in the polymer molecule with the remainder being at least one monoethylenically unsaturated comonomer and (2) between about 5 and 30 parts by weight of a thermoplastic polymeric modifying agent having a molecular weight of at least about 30,000 and a softening temperature of at least about 90° C., which consists of a halogenated derivative of epichlorohydrin and a 4,4'-alkylidene bisphenol wherein said halogenated derivative is produced by the reaction of essentially stoichiometric amounts of a 4,4'-alkylidene bisphenol with a diglycidyl ether of a 4,4'-alkylidene bisphenol in the presence of a tertiary amine catalyst in an amount sufficient to provide at least 0.02 percent nitrogen by weight of said composition added as $NR_3$ where each R is an alkyl substituent containing between 2 and 6 carbon atoms and wherein one of said 4,4'-alkylidene bisphenol and diglycidyl ether of 4,4'-alkylidene bisphenol has from about 3 to 4 halogen atoms selected from the group consisting of bromine and chlorine attached to the nuclear carbon atoms said halogen being present in amount sufficient to provide at least 10.5 weight percent bromine or at least 19 weight percent chlorine based on the weight of the mixture of said vinyl chloride polymer and said polymeric modifying agent.

5. The method of claim 4 wherein said vinyl chloride polymer is polyvinyl chloride.

6. The method of claim 5 wherein said diglycidyl ether is the diglycidyl ether of 4,4'-isopropylidenediphenol and said 4,4'-alkylidene bisphenol is 4,4'-isopropylidenebis(2,6-dichlorophenol).

References Cited by the Examiner

UNITED STATES PATENTS

| | | | |
|---|---|---|---|
| 2,602,075 | 7/1952 | Carpenter et al. | 260—47 |
| 2,717,216 | 9/1955 | Arone | 260—837 |
| 2,837,497 | 6/1958 | Delmonte | 260—47 |
| 2,965,608 | 12/1960 | Martin et al. | 260—837 |
| 3,004,951 | 10/1961 | Dazzi | 260—47 |
| 3,016,362 | 1/1962 | Wismer | 260—47 |

OTHER REFERENCES

Lee et al., "Epoxy Resins," pages 35–41 relied on, July 1957.

MURRAY TILLMAN, *Primary Examiner.*

J. C. BLEUTGE, *Assistant Examiner.*